(12) United States Patent
Nottingham

(10) Patent No.: US 6,252,576 B1
(45) Date of Patent: Jun. 26, 2001

(54) HARDWARE-EFFICIENT SYSTEM FOR HYBRID-BILINEAR IMAGE SCALING

(75) Inventor: James R. Nottingham, Boise, ID (US)

(73) Assignee: In-System Design, Inc., Boise, ID (US)

( * ) Notice: Subject to any disclaimer, the term of this patent is extended or adjusted under 35 U.S.C. 154(b) by 0 days.

(21) Appl. No.: 09/130,628

(22) Filed: Aug. 6, 1998

(51) Int. Cl.[7] ............................... G09G 5/00; G06T 3/40
(52) U.S. Cl. ............................ 345/127; 345/439
(58) Field of Search ................................ 345/523, 418, 345/137, 439, 466, 127; 382/299, 114; 348/458, 586; 358/1, 451, 428

(56) References Cited

U.S. PATENT DOCUMENTS

| | | |
|---|---|---|
| 3,893,166 | 7/1975 | Pugsley . |
| 3,938,102 | 2/1976 | Morrin et al. . |
| 3,995,253 | 11/1976 | Morrin, II et al. . |
| 4,799,173 | 1/1989 | Rose et al. . |
| 4,816,913 | 3/1989 | Harney et al. . |
| 4,837,722 | 6/1989 | Sara . |
| 4,903,147 | 2/1990 | Kanno et al. . |
| 4,937,761 | 6/1990 | Hassett . |
| 5,327,257 | 7/1994 | Hrytzak et al. . |
| 5,335,296 * | 8/1994 | Larkin et al. ................. 345/439 X |
| 5,384,904 * | 1/1995 | Sprague et al. ................ 345/439 |
| 5,400,154 | 3/1995 | Takayama et al. . |
| 5,517,612 * | 5/1996 | Dwin et al. .................... 345/466 |
| 5,570,436 | 10/1996 | Fukushima et al. . |
| 5,586,196 * | 12/1996 | Sussman ........................ 382/114 |
| 5,621,870 | 4/1997 | Shyu et al. . |
| 5,646,696 * | 7/1997 | Sprague ......................... 348/458 |
| 5,666,437 | 9/1997 | Vondran, Jr. . |
| 5,682,179 | 10/1997 | Cahill, III . |
| 5,684,981 | 11/1997 | Jones . |
| 5,717,507 | 2/1998 | Vondran, Jr. . |
| 5,726,766 | 3/1998 | Saotome . |
| 5,737,101 | 4/1998 | Ito . |
| 5,745,123 | 4/1998 | Rice . |
| 5,838,838 * | 11/1998 | Overton ........................ 382/298 |
| 5,850,227 * | 12/1998 | Longhenry et al. ............ 345/439 |

OTHER PUBLICATIONS

Randy Crane, A Simplified Approach to Image Processing, Classical and Modern Techniques in C, "Chapter 4 Geometric Processes," 1997, pp. 110–113.

* cited by examiner

Primary Examiner—Jeffery Brier
Assistant Examiner—Chante Harrison
(74) Attorney, Agent, or Firm—Marger Johnson & McCollom, P.C.

(57) ABSTRACT

A hybrid bilinear scaling (Qscale) scheme produces output images that have comparable quality to traditional bilinear interpolation algorithms, but requires a less complex hardware implementation. The Qscale system does not reverse-map output pixels back to arbitrary locations in the input space as defined by the mapping function. Rather all pixel values and locations are calculated after all of the original input pixels are mapped to the output. That is, all of the original image pixels are used "as-is" in the resultant scaled image. New pixels are generated from the original input pixels to meet the desired output pixel dimensions. Because only new pixels are computed, the Qscale system is less computationally complex. The computational requirements are further reduced because new pixels are computed between original pixel pairs meaning only two pixels are involved in the computation. Coefficients can be chosen to be fractional powers of two (0.5, 0.25, 0.125, etc) for the interpolation calculation between pixel pairs. By selecting coefficients this way, the linear computation reduces to a "shift-and-add" operation, which is easily implemented in hardware.

18 Claims, 9 Drawing Sheets

| N | $\alpha n, \beta n$ |
|---|---|
| 1 | $\alpha 1=1/2, \beta 1=1/2$ |
| 2 | $\alpha 1=3/4, \beta 1=1/4$ <br> $\alpha 2=1/4, \beta 2=3/4$ |
| 3 | $\alpha 1=3/4, \beta 1=1/4$ <br> $\alpha 2=1/2, \beta 2=1/2$ <br> $\alpha 3=1/4, \beta 3=3/4$ |
| 4 | $\alpha 1=3/4, \beta 1=1/4$ <br> $\alpha 2=5/8, \beta 2=3/8$ <br> $\alpha 3=3/8, \beta 3=5/8$ <br> $\alpha 4=1/4, \beta 4=3/4$ |
| 5 | $\alpha 1=3/4, \beta 1=1/4$ <br> $\alpha 2=5/8, \beta 2=3/8$ <br> $\alpha 3=1/2, \beta 3=1/2$ <br> $\alpha 4=3/8, \beta 4=5/8$ <br> $\alpha 5=1/4, \beta 5=3/4$ |
| 6 | $\alpha 1=7/8, \beta 1=1/8$ <br> $\alpha 2=3/4, \beta 2=1/4$ <br> $\alpha 3=5/8, \beta 3=3/8$ <br> $\alpha 4=3/8, \beta 4=5/8$ <br> $\alpha 5=1/4, \beta 5=3/4$ <br> $\alpha 6=1/8, \beta 6=7/8$ |
| 7 | $\alpha 1=7/8, \beta 1=1/8$ <br> $\alpha 2=3/4, \beta 2=1/4$ <br> $\alpha 3=5/8, \beta 3=3/8$ <br> $\alpha 4=1/2, \beta 4=1/2$ <br> $\alpha 5=3/8, \beta 5=5/8$ <br> $\alpha 6=1/4, \beta 6=3/4$ <br> $\alpha 7=1/8, \beta 7=7/8$ |
| 8 | $\alpha 1=7/8, \beta 1=1/8$ <br> $\alpha 2=3/4, \beta 2=1/4$ <br> $\alpha 3=5/8, \beta 3=3/8$ <br> $\alpha 4=1/2, \beta 4=1/2$ <br> $\alpha 5=1/2, \beta 5=1/2$ <br> $\alpha 6=3/8, \beta 6=5/8$ <br> $\alpha 7=1/4, \beta 7=3/4$ <br> $\alpha 8=1/8, \beta 8=7/8$ |

FIG.3B

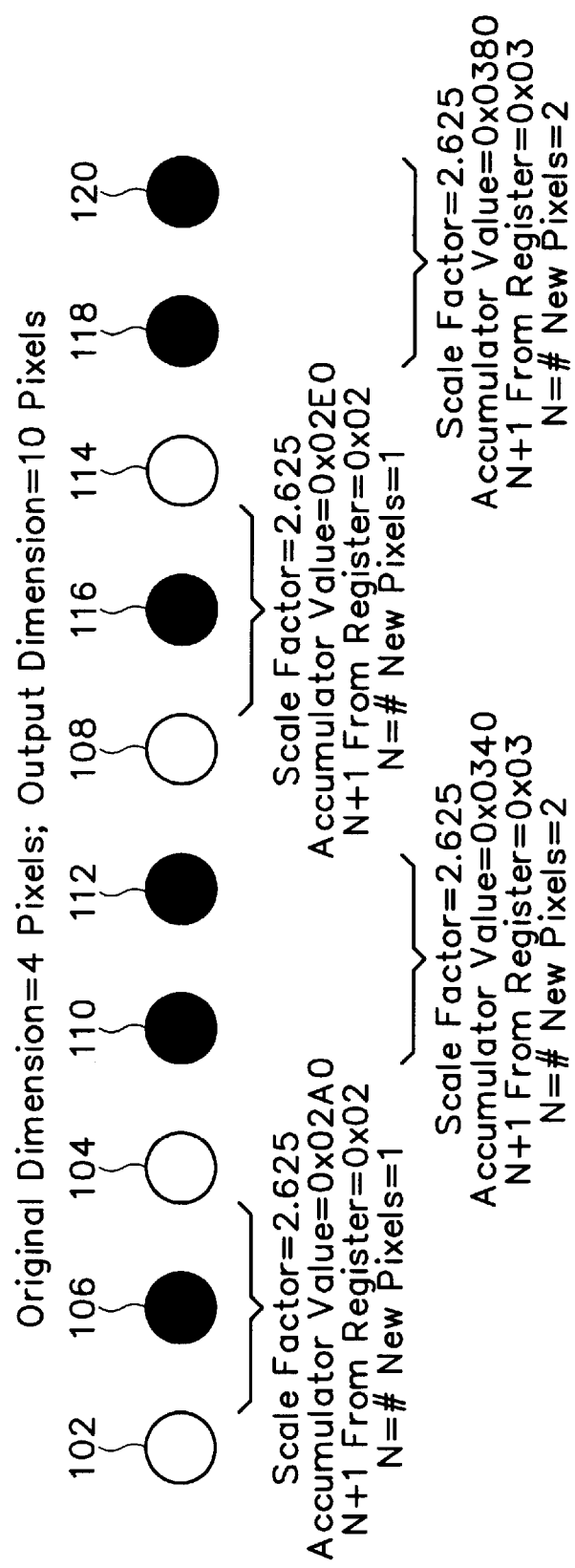

HARDWARE-EFFICIENT SYSTEM FOR HYBRID-BILINEAR IMAGE SCALING

BACKGROUND OF THE INVENTION

The invention relates to changing the size of images and more particularly to a hybrid bilinear scaling system that provides high quality output images.

The process of changing the size of an image is commonly referred to as scaling. There are several well-defined and well-understood methods used for image scaling. An overview of the subject is described in A *Simplified Approach to Image Processing*, R. Crane, Prentice Hall, Inc., 1997.

Scaling methods range from trivial, pixel-replication techniques to more complex, higher order algorithms. When selecting a particular scaling technique for a given application, a tradeoff is made between computational complexity and resultant image quality. For applications with stringent computational limits or loose image quality requirements, pixel-replication is a popular method used for scaling. Conversely, if an application can afford higher computational costs, or if there are tighter constraints on the output image quality, more complex scaling schemes are used. The most common alternative to pixel replication is bilinear interpolation, which provides improvement in image quality at a moderate computational expense.

With bilinear interpolation, new or scaled pixels are computed as a weighted sum of neighboring pixels. Weights are computed linearly and proportionally to the distance the new pixel is to existing or neighboring pixels. The new pixel locations, relative to the input (original) pixels, are determined by reverse-mapping the desired, destination pixels back to the input space. In most cases, the original input pixels are not used in the resultant output image. The only time input pixels are directly mapped to an output pixel is when the reverse-mapping of the output pixel location happens to land exactly on a grid location in the original input space. Thus, techniques, like bilinear interpolation, are computationally exhaustive and require complex scaling circuitry. Accordingly, a need remains for a simple scaling technique that produces high image quality.

SUMMARY OF THE INVENTION

A hybrid bilinear scaling scheme, dubbed Qscale, produces output images that have comparable quality to traditional bilinear interpolation algorithms, but requires a less complex hardware implementation. The Qscale algorithm system takes a different approach to determine the location and value of output pixels. Rather than reverse-mapping output pixels back to arbitrary locations in the input space (as defined by the mapping function), all output pixel values and locations are calculated after all of the original input pixels are mapped to the output image. That is, all of the original image pixels are used "as-is" in the resultant scaled output image. New pixels are generated from the original input pixels to meet the desired output pixel dimensions. The new pixel values are linearly interpolated between pixel pairs. Since all original pixels in the input image are used in the output image, the Qscale system is less computationally complex because fewer new pixels have to be generated, and there is not a "reverse-mapping" requirement in the computation.

The computational requirements are further reduced because new pixels are computed between original pixel pairs, meaning that there are only two pixels involved in the interpolation computation of a new pixel. Since new pixels are computed linearly from existing pixels, coefficients can be chosen to be fractional powers of two (0.5, 0.25, 0.125, etc.) for the interpolation calculation between pixel pairs. By selecting coefficients this way, the linear computation reduces to a "shift-and-add" operation, which is extremely efficient in hardware. By constraining the computation to be between two existing pixels, a fixed set of coefficients can be selected such that new pixels are computed as a weighted average that is proportional to the relative location of the new pixel between the existing pixels. The number of new pixels generated between each pair of pixels is proportional to the desired scale factor.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 3B is a table of sample Qscale interpolation coefficients.

FIG. 8 is a diagram showing how the accumulation circuit in FIG. 7 operates.

DETAILED DESCRIPTION

Figure 1:
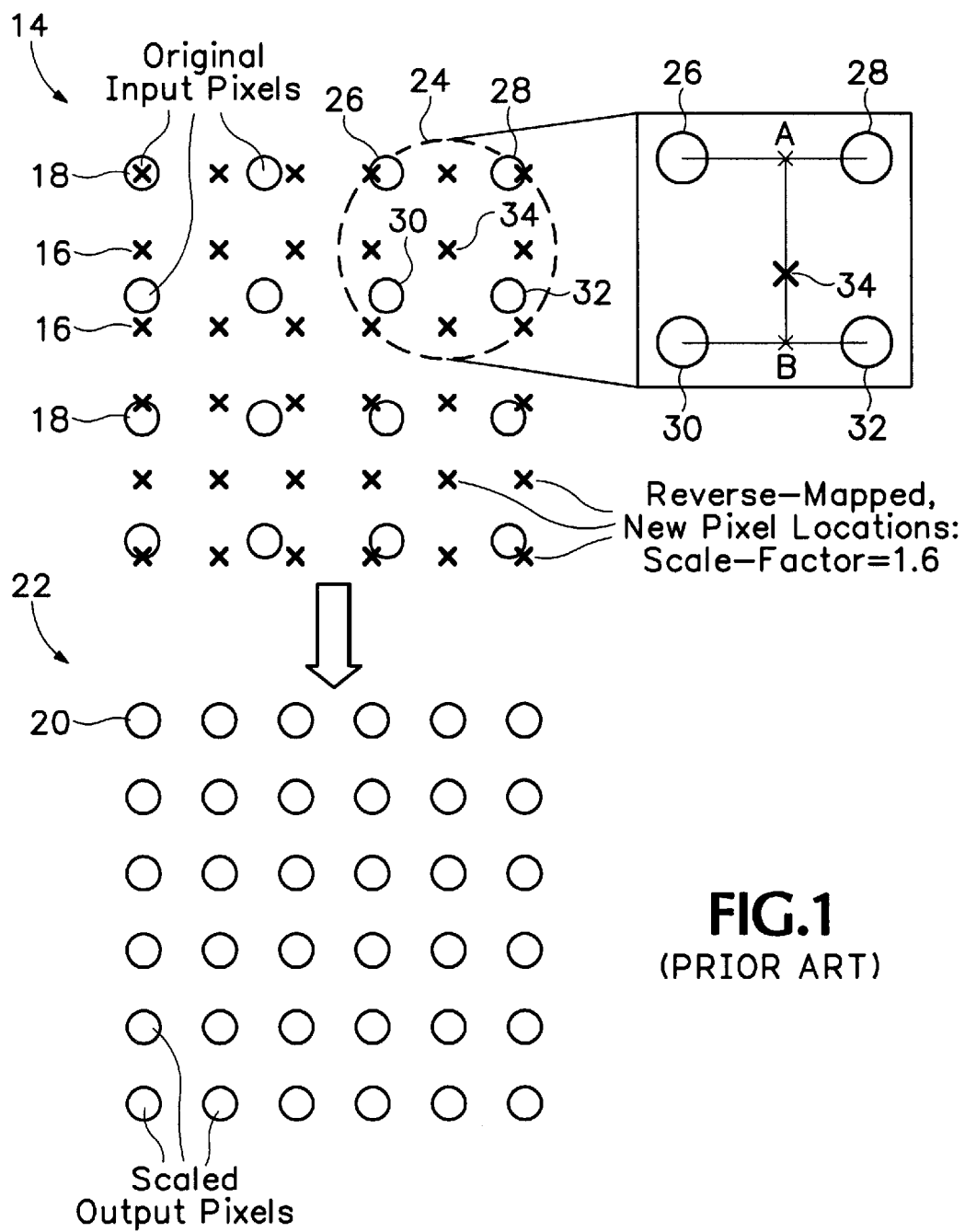
FIG. 1 is a diagram showing a prior art bilinear scaling technique.

An example of a prior art bilinear interpolation is shown in FIG. 1. Small "x's" denote the locations of the reverse-mapped output pixels 20. The "x's" denote where the new pixels 16 would be located if resolution of an input image 14 were increased to match the number of pixels 20 in an output or destination image 22. The actual values of the new pixels 16 are computed using interpolation. That is, the values for new pixels 16 are computed as a weighted-average of the four original nearest neighbor pixels 18. The weights are linearly proportional to the distance from the neighboring original pixels 18 to the new pixel 16.

Referring to a cutaway 24 in FIG. 1, the prior art bilinear interpolation operation is illustrated. Values at points A and B are both computed by performing a linear interpolation between the original pixels 26, 28 and 30, 32, respectively. After values for points A and B are computed, a final pixel 34 is computed by performing another linear interpolation between the values derived from points A and B.

To compute the new pixel value 34, three linear interpolations are required. Each linear interpolation involves two multiplies, a shift, and an add. In addition, the reverse mapping requires multiply/divide type operations to compute the new pixel locations. The computational requirements are shown in the following equations:

Typical Interpolation Calculation:

$$Pnew = P1 + (x-x1)/(x2-x1) \cdot (P2-P1) \quad (1)$$

Where: P1, P2=Pixels to interpolate between; x=Position of new pixel relative to the given pixels; and x1, x2=Positions of pixels used for the interpolation.

Typical Reverse-Mapping Calculation:

$$(x,y) = (x_{out}/SF, y_{out}/SF) \quad (2)$$

Where: x,y=Positional coordinates of the new pixel relative to the input space;

$X_{out}, Y_{out}$=Positional coordinates of the new pixel relative to the output space (integer indices); and SF=Specified scale factor.

Figure 2:
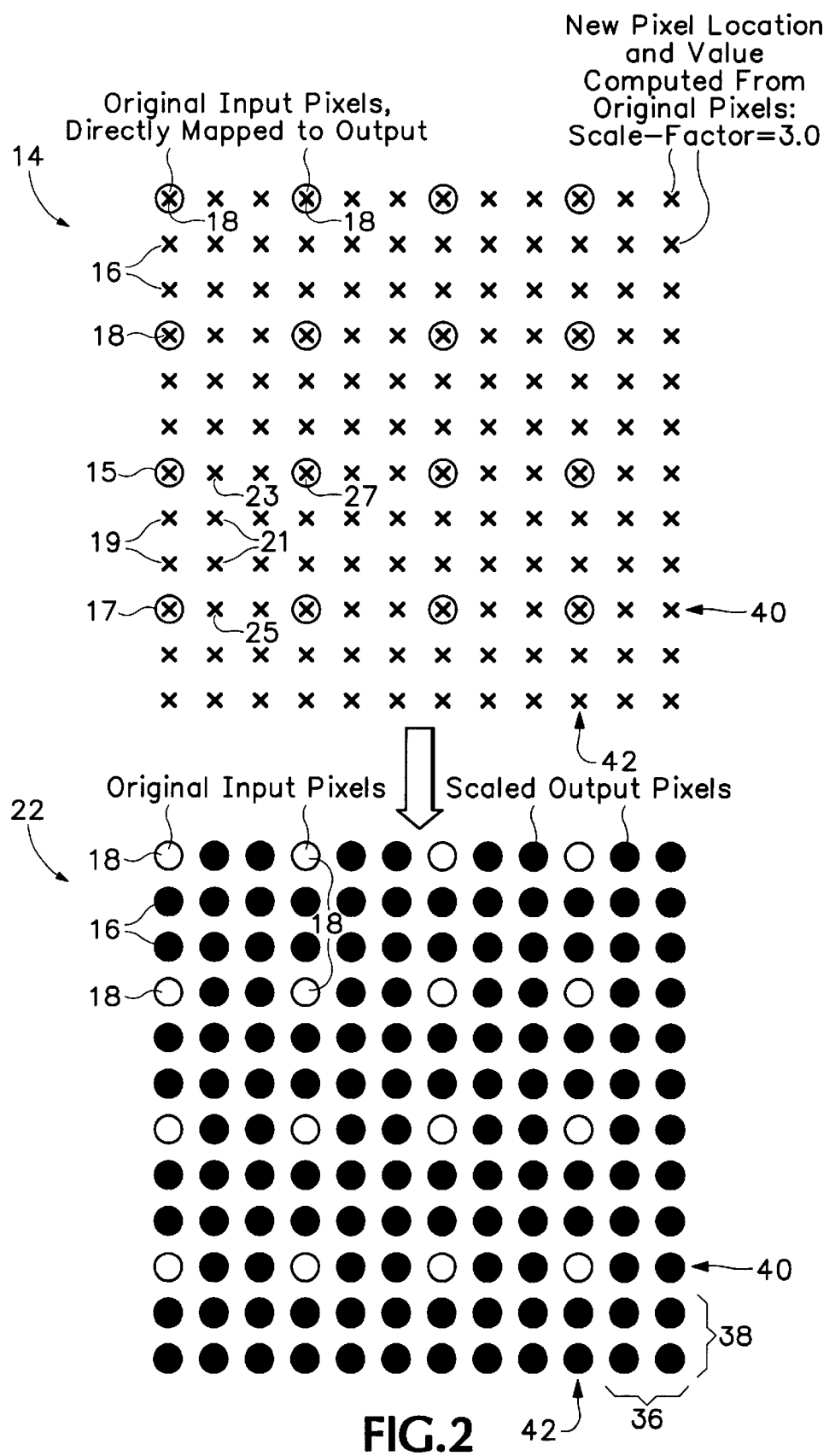
FIG. 2 is a diagram showing a hybrid bilinear scaling scheme (Qscale) according to the invention.

Referring to FIG. 2, small "x's" denote the new pixel locations 16. Circles denote existing pixels 18 in the original image 14. Since new pixels 16 are computed from existing pixel pairs 18, the Qscale process is broken down into horizontal and vertical interpolation steps. First, new pixels 16 are interpolated between existing pixel pairs in a horizontal direction, and then a similar step is performed in the vertical direction. It would be equally effective to perform the vertical interpolation step first, followed by the horizontal interpolation step. In either case, the second step involves computing new pixels from pixel pairs that came from the previous interpolation step.

The new pixels derived during horizontal scaling that are vertically adjacent to each other, are used along with the original pixel values by the Qscale system to generate the new pixels that reside between each adjacent row in the original image 14. For example, during horizontal scaling, original pixels 15 and 27 are used to derive new pixel 23. During vertical scaling, original pixels 15 and 17 are used to generate new pixels 19. However, the new pixels 21 are derived from the new pixels 23 and 25 that were previously derived during the horizontal scaling. As shown in FIG. 2, all of the original image pixels 18 are preserved in the output image 22 and are represented by non-shade circles. Shaded circles represent the new pixels 16 in the output image 22. Thus, computations are only required for the new pixels 16.

There are also new pixels 16 in columns 36 and rows 38 on the right-most and bottom-most edges of output image 22, which do not reside between existing pixels 18. This is a boundary condition that is encountered whenever pixel processing is required outside of the boundary of the original image 14. The boundary condition is handled by duplicating the last row 40 and column 42 of the original image 14.

Hybrid-Bilinear Interpolation

Figure 3A:
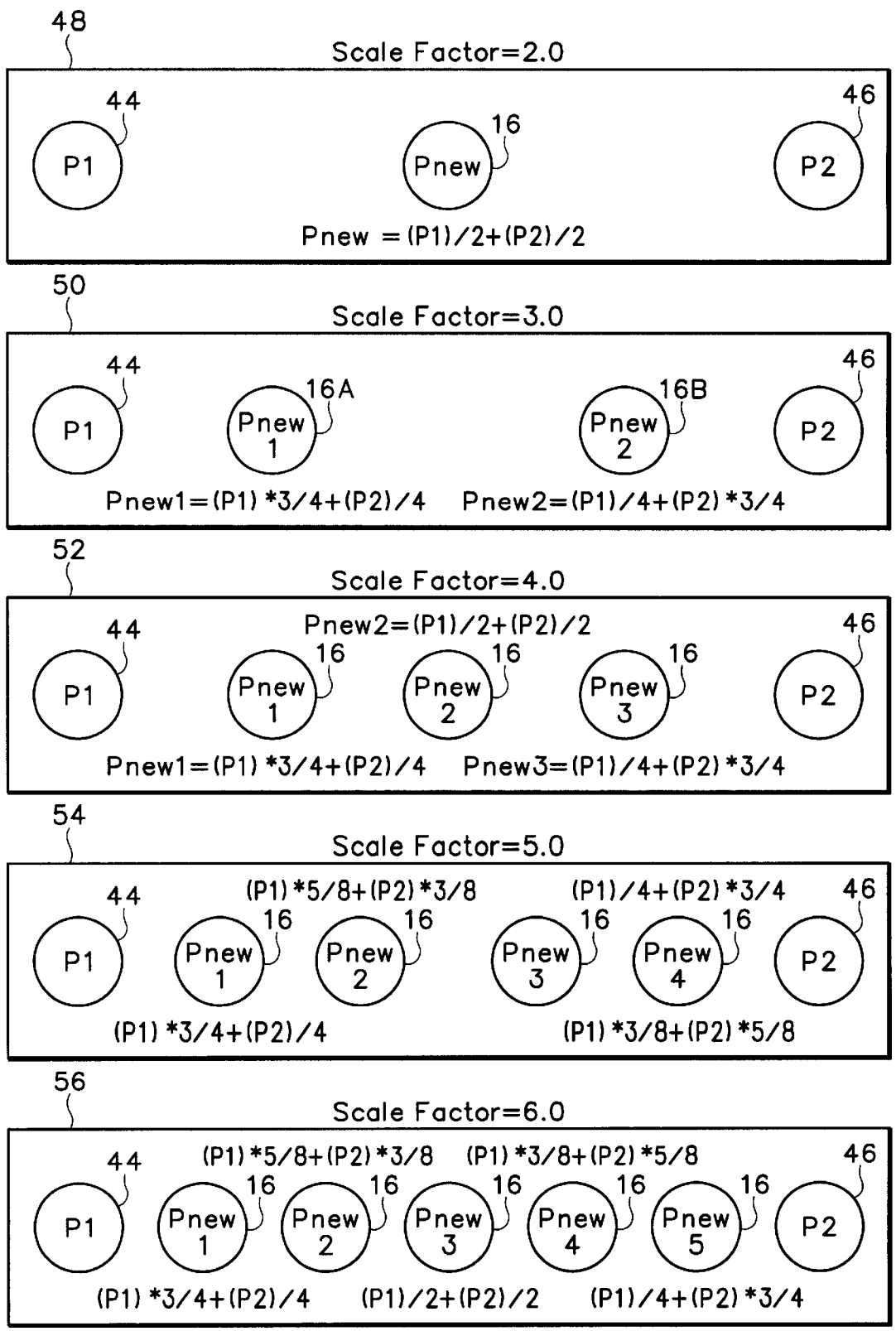
FIG. 3A is a detailed diagram showing how Qscale is performed in FIG. 2.

FIG. 3A is a detailed diagram showing how new pixels 16 are generated between an original pixel pair 44, 46 in the input image 14. The number of new pixels 16 that are computed is proportional to an applied scale factor. The values of the new pixels 16 are linearly proportional to their relative distances to the existing pixels 44 and 46. The value for the new pixels 16 are, therefore, dependent upon the number of new pixels, and indirectly proportional to the scale factor. The number of new pixels 16 generated between adjacent pairs of original pixels 44 and 46 and the values of the new pixels 16 for scale factors of 2.0, 3.0, 4.0, 5.0 and 6.0 are shown in boxes 48, 50, 52, 54 and 56, respectively. A set of coefficients are defined which specify the linear interpolation between existing pixels 44 and 46 based upon the number of new pixels 16 being generated. Since it is desired that the results model a linear interpolation, the only constraint is that the coefficients used to derive the new pixel values must have a sum equal to unity.

The coefficients are defined mathematically as follows:

$$Pn = \Sigma_n [\alpha_n \cdot P1 + \beta_n \cdot P2]; \, n=1,2,\ldots,N \quad (3)$$

Where: $\alpha_n, \beta_n$=Coefficients; $\alpha_n+\beta_n=1$, for all n; Pn=$n^{th}$ new pixel; P1, P2=a selected input pair of pixel values; and N=Number of new pixels to be computed.

From equation 3, it can be seen that the coefficients $\alpha_n$ and $\beta_n$ come in pairs. Each coefficient of the pair corresponds to a weight that is applied to the respective pixel from the given input pixel pair 44, 46. For each scale factor, there will be a set of N coefficient pairs, where N is computed from the specified scale factor.

For example, two new pixels 16A and 16B are inserted between original pixels 44 and 46 in box 50. The coefficient $\alpha_1$ for the first new pixel 16A is ¾ and the coefficient $\beta_1$ for the first new pixel 16A is ¼. Because the new pixel 16A is closer to original pixel 44 (P1), the coefficient $\alpha_1$ applied to original pixel P1 is larger and the coefficient $\beta_1$ applied to original pixel 46(P2) is smaller. The coefficient $\alpha_2$ for the second new pixel 16B is ¼ and the coefficient $\beta_2$ for the second new pixel 16B is ¾. Accordingly, the coefficient $\alpha_2$ is applied to original pixel P1 is smaller and the coefficient $\beta_2$ applied to original pixel 46(P2) is larger.

Since the coefficients $\alpha_2$ and $\beta_n$ are computed linearly between two pixels 44 and 46, and since the two given pixels are either horizontally or vertically aligned, the Qscale interpolation is termed as hybrid-bilinear. The Qscale system produces scaled image quality that is comparable to higher-order schemes. For (N<16), experimental results indicate that Qscale produces an output image quality that is indistinguishable from bilinear interpolation for most images. Note, however, that the same fundamental principles hold true with regards to quality for higher values of N. Higher values of N (>16) can be used in the selection of coefficients and can be implemented in hardware or software.

Coefficient values $\alpha_n$ and $\beta_n$ can be any rational number as long as they satisfy the conditions above. There are values that can be selected which are trivial to implement in hardware. In particular, rational coefficients that are powers of two are well suited for hardware implementations. One particular set of coefficients is shown in table 1 of FIG. 3B. This particular set of coefficients defines the values of N new pixels for inserting between any pair of original pixels where N≦8. FIG. 3B is simply one possible set of coefficients. This set has been shown experimentally to be effective, but any given set of coefficients for any number of new pixels can be used without affecting the Qscale system.

It is important to note that while the examples above use only integer scaling factors, non-integer or fractional scaling factors can also be accommodated with the Qscale system. For example, if the scale factor is set to 3.333, then two new pixels would be inserted between the given pixel pairs for every two consecutive pairs of input pixels. Then, three new pixels would be inserted between every third set of pixel pairs. This would have the net effect of scaling by 3.333 across the entire scanline.

The actual mechanism used to accomplish this is a modified Bresenham accumulation function, which essentially counts the number of new pixels 16 to be generated between each existing pixel pair. This counting or accumulation process properly distributes the new pixels to maintain the specified scale-factor. The Bresenham accumulation function is used in several existing image processing functions, including interpolation schemes.

The Qscale system can be applied to both horizontally aligned and vertically aligned pixels with independent scale factors in each dimension. Therefore, the Qscale system enables arbitrary and independent fractional scaling in both the vertical and horizontal directions.

Hardware Implementation

As mentioned above, the Qscale system is well suited for an efficient hardware implementation. There are many possible implementations of the Qscale system, therefore, the implementation details described below are kept fairly generic. Specific implementation examples are also described for illustrative purposes which should not be interpreted to limit the scope of the invention. Considerations related to the actual speed, size, or relative Qscale throughput are implementation details that can vary depending upon the specific processing requirement of the application and these variations come within the scope of the present invention. Design issues such as line buffering, two-dimensional versus one-dimensional interpolation, and scanline orientation are not discussed but would be readily implemented by one having average skill. These are items common to all scaling implementations, and they too can vary on a per-implementation basis and come within the scope of the present invention.

Figure 4:
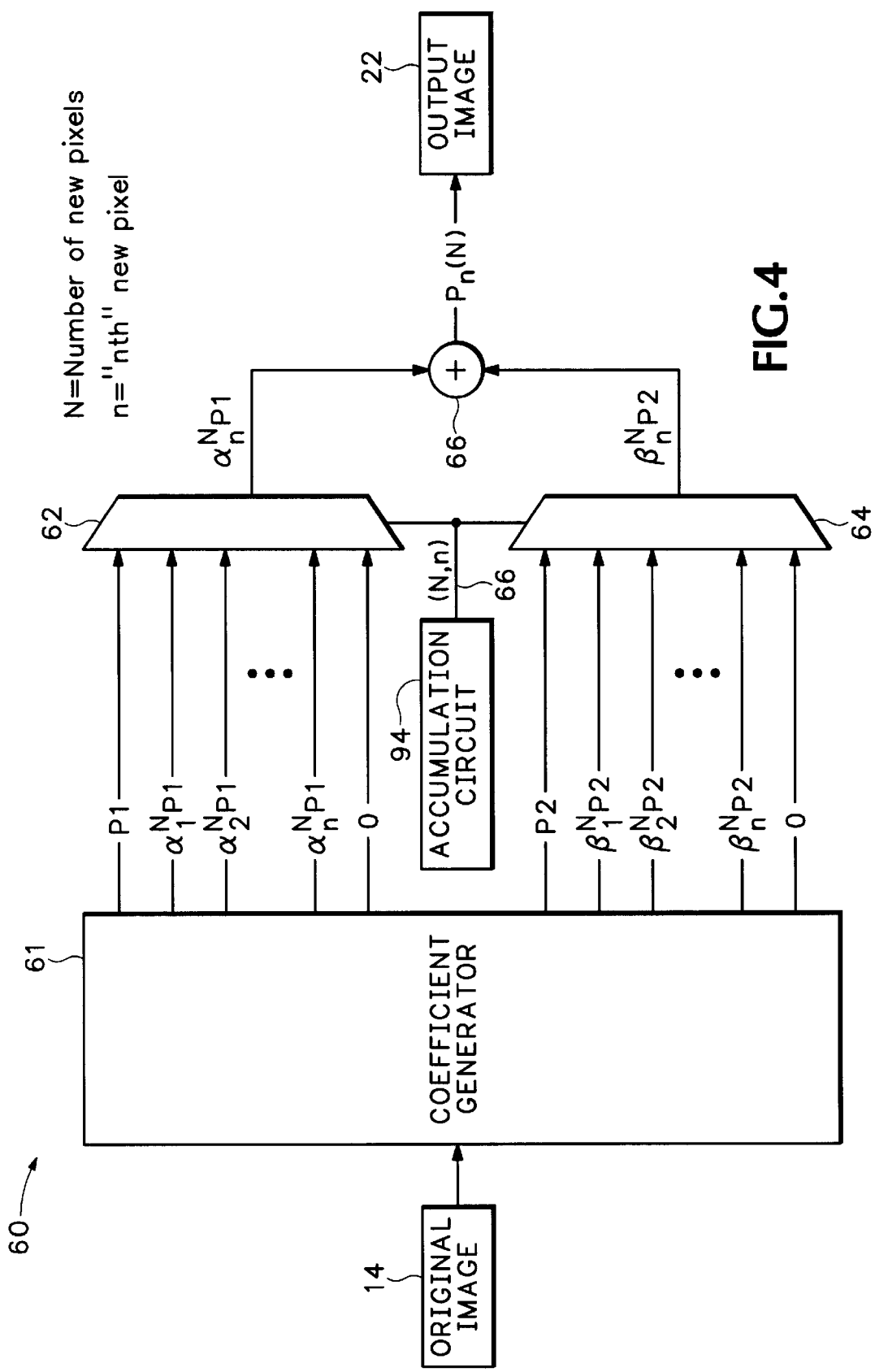
FIG. 4 is a block diagram showing one hardware implementation of the Qscale system according to the invention.

FIG. 4 is a diagram of a generic implementation for the Qscale system 60. An interpolation engine comprises essentially two MUXes 62 and 64 and an adder 66. The MUXes 62 and 64 select which hard-wired coefficients $\alpha_n$ and $\beta_n$ to use from a coefficient generator 61. A control line 66 is coupled between an accumulation circuit 94 and MUXes 62 and 64 and determines the number of new pixels (N) that will be derived between consecutive pairs of existing pixels P1 and P2 (FIG. 3A) according to a scale factor. The coefficient generator 61 generates the coefficients $\alpha_n$ and $\beta_n$ for each $n^{th}$ new pixel and applies the coefficients $\alpha_n$ and $\beta_n$ to the two consecutive original pixels P1 and P2 from original image 14. The two coefficients are applied to the original pixel values and are then added together with the adder 66 to generate the new pixel value Pn(n).

The interpolation circuit 60 generates the new pixel values Pn(n) between original pixels P1 and P2. Then the new pixel values are determined for the next two vertically or horizontally adjacent pixels P2 and P3, and so on, repeating for the entire dimension. After all the new pixels are derived for all horizontal rows (or alternatively for all vertical columns), then the new pixels are derived for all vertical columns (or alternatively for all horizontal rows).

Figure 5:
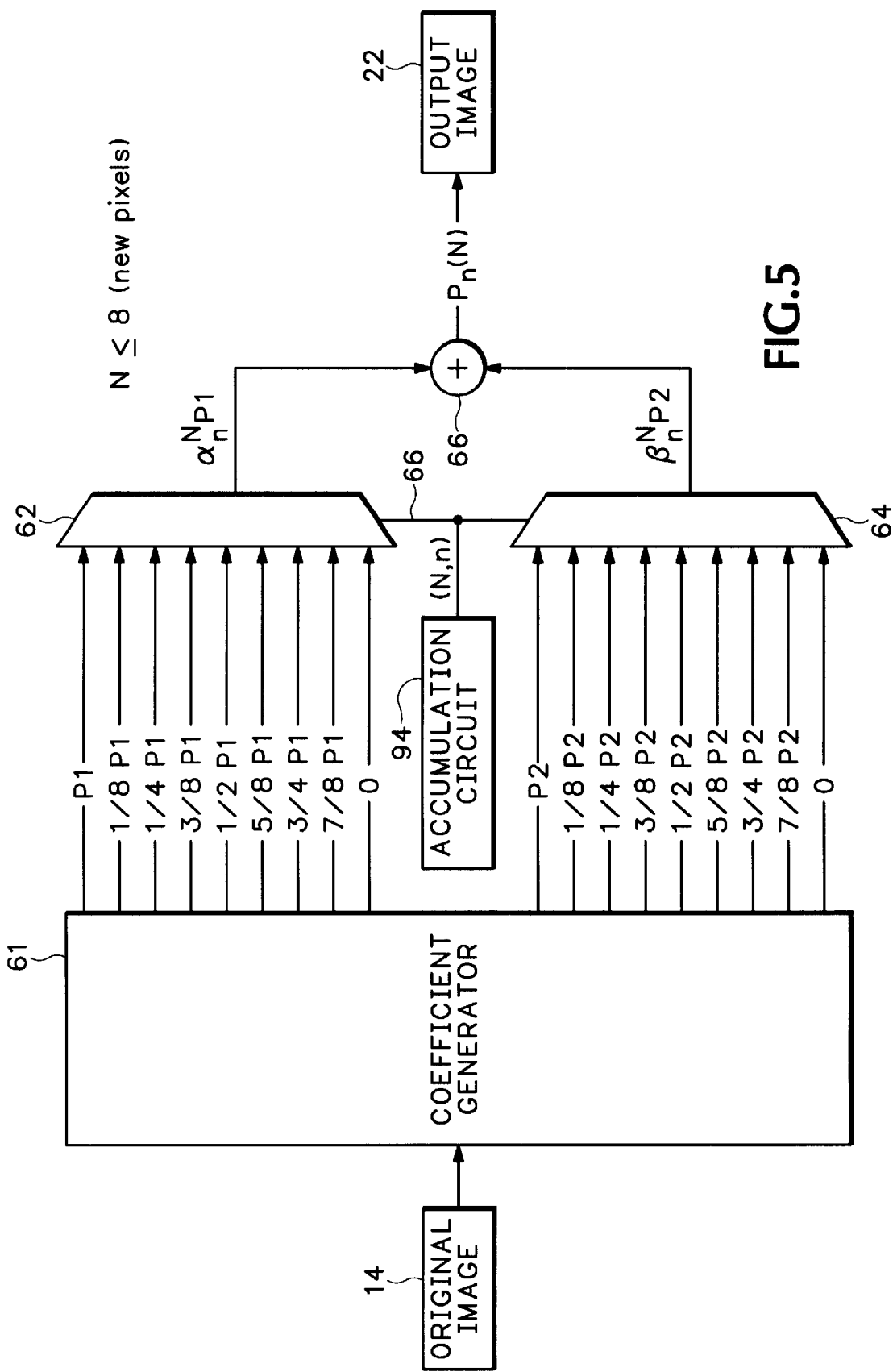
FIG. 5 is a block diagram showing a hardware example of a Qscale system that can insert $N \leq 8$ new pixels between original input pixels.
Figure 6:
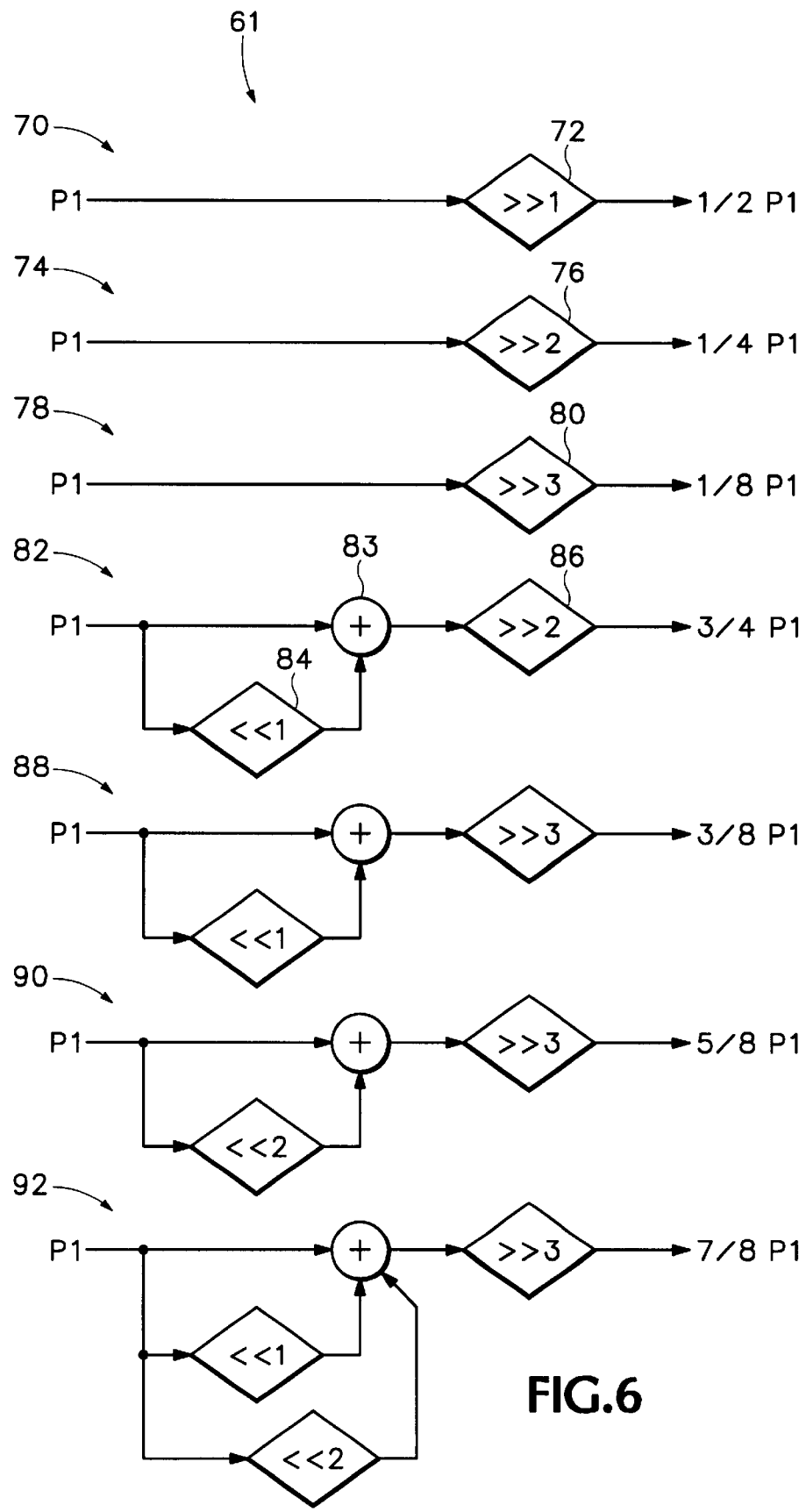
FIG. 6 shows one implementation example for a Qscale coefficient generator shown in 5.

FIG. 5 shows one Qscale implementation for generating new pixels using Table 1 in FIG. 3B for N≦8. FIG. 6 is a detailed circuit diagram of the coefficient generator 61 in FIG. 5. Note that no multiplication operations are actually required. That is, each of the coefficient values $\alpha_n$ and $\beta_n$ are computed from a simple shift-and-add operation. A coefficient value ½ is generated using a one-bit shifter 72 in circuit 70. Similarly, a coefficient value ¼ is generated in circuit 74 using a two bit shifter 76 and a ⅛ coefficient value is generated in circuit 78 by using a three bit shifter 80. A ¾ coefficient value is generated in circuit 82 by first shifting the original pixel P1 one bit to the left (2P1) with shifter 84 and then adding the output of shifter 84 with the original pixel value P1 with adder 83 (3P1). The value 3P1 is then divided by ¼ by shifting the output of adder 83 two bits to the right (¾P1). Similar shifting is used to generate the coefficient values ⅜ in circuit 88, ⅝ in circuit 90 and the ⅞ in circuit 92.

Note that no multiplication operations are actually required. That is, each of the coefficient values $\alpha_n$ and $\beta_n$ are computed from a simple shift-and-add operation. It should also be appreciated that other shift and add operations can generate the same results. For example, in circuit 82, the coefficient value ¾P1 can be generated by first shifting the value of P1 one bit to the right (½P). The output of adder 83 is then 3⁄2P1. The shifter 86 could then generate the value ¾P1 by shifting the output of adder 83 one bit to the right (½).

The example shown in FIG. 6 shows the Qscale coefficients applied to the original pixel P1 but the same circuitry is used for generating the coefficients applied to the value for original pixel P2. The single-stage Qscale system shown in FIGS. 5 and 6 can be duplicated to compute up to 8 new pixels in parallel. If throughput constraints allow, the coefficient generator 61 can be implemented as a single-stage computational unit that generates up to 8 pixels in a serial fashion. Alternatively, separate vertical and horizontal stages can be used at the same time. After new pixels are derived for two rows or two columns of the original image, the other stage can begin generating the new pixels in the perpendicular direction. Thus, the new pixels in the output image 22 can be generated in less time.

Figure 7:
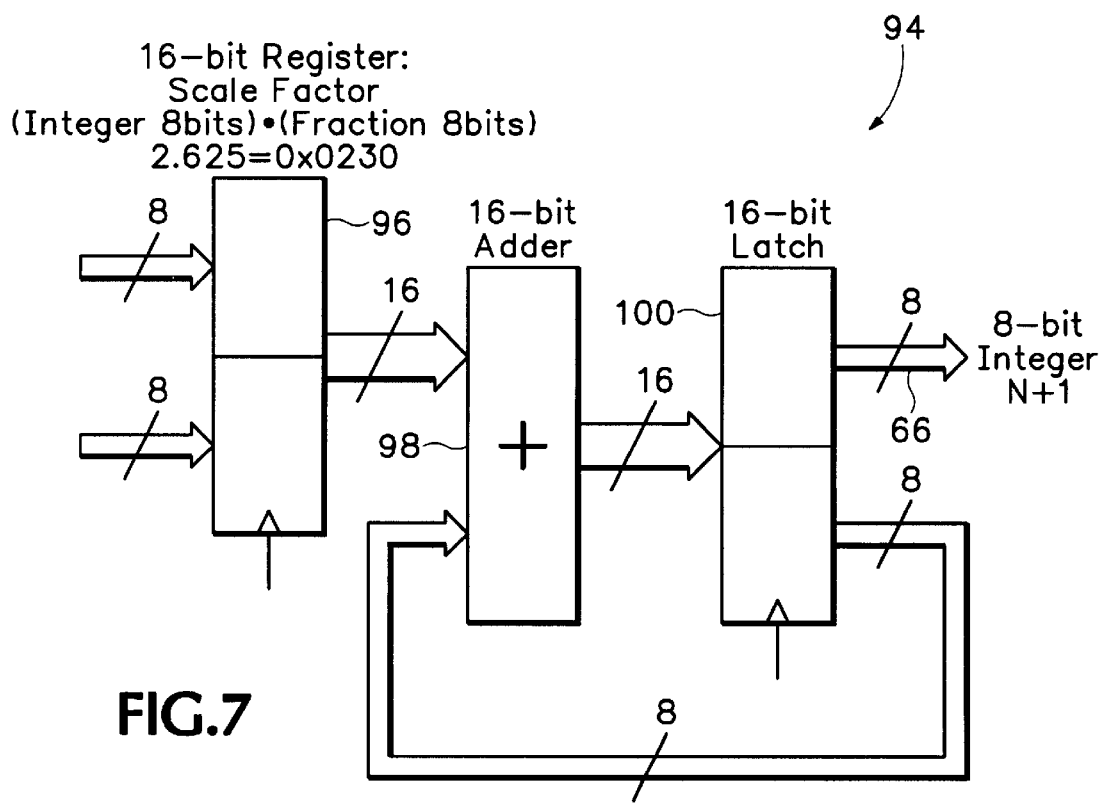
FIG. 7 shows one implementation example for a Qscale accumulation circuit shown in FIG. 5.

A particular hardware implementation for a modified Bresenham accumulator circuit 94 is shown in FIG. 7. The accumulator circuit 94 keeps track of the number of new pixels to insert between each original pair of adjacent pixels according to a given scale factor. The accumulation circuit 94 is a fixed-integer implementation of a floating-point procedure. The output of the accumulator circuit 94 is used as one of the MUX controls 66 for the interpolation engine shown in FIG. 5. In other words, the accumulator circuit 94 computes the number of new pixels N.

An example of how the accumulator works is shown in FIG. 8. Referring to FIGS. 7 and 8, a scale factor 2.625 is loaded into a register 96. The upper 8 bits of register 96 stores the integer value of the scale factor (2) and the lower 8 bits of register 96 store the fractional portion of the scale factor (0.625). Latch 100 in FIG. 7 is originally initialized to zero. On the first iteration through the accumulation circuit 94, the value 2.625 is added to the zero value in the lower 8 bits of latch 100 for a value of 2.625. Since the upper 8 integer bits of latch 100 (N+1) is equal to 2, the value of N equal to 1. Accordingly, one new pixel 106 is generated by the Qscalc system between the first pair of original pixels 102 and 104. The coefficient values for N=1 in the coefficient table 1 in FIG. 3B are $\alpha_1$=½ and $\beta_1$=½. The interpolation engine MUX 62 in FIG. 5 selects the ½ P1 output from circuit 70 in coefficient generator 61. Similarly, the interpolation engine MUX 64 in FIG. 5 selects the ½ P2 output from coefficient generator 61 in FIG. 5. Interpolation engine adder 66 then generates the new pixel value 106.

On the second iteration, the accumulation circuit 94 determines the number of new pixels that are to be interpolated between the next adjacent pair of original pixels 104 and 108. The scale factor 2.625 in register 96 is added to the fraction value 0.625 in the lower 8 bits of latch 100 from the previous iteration. The adder 98 generates the value 2.625+0.625=3.25.

The integer value of latch 100 (N+1) is equal to 3 and therefore the number of new pixels inserted between original pixels 104 and 108 is equal to N=2.

Table 1 in FIG. 3B is then referenced to determine the set of coefficient values for N=2. The first new pixel 110 is derived using the coefficient values $\alpha_1$=¾ and $\beta_1$=¼ and the second new pixel 112 is derived using the coefficient values $\alpha_1$=¼ and $\beta_2$=¾. The new pixel values are then interpolated from the original pixels 104 and 108 using the interpolation engine shown in FIG. 5 as described above.

A next iteration of the accumulator circuit 94 adds the fractional value from the previous iteration (0.25) to the scale factor 2.625 to generate a new value 2.875 in latch 100. Thus, only one new pixel 116 is generated between the next pair of original pixels 108 and 114. In a similar manner, two new pixels 118 and 120 are generated on the next iteration of accumulation circuit 94. On the average for the horizontal line shown in FIG. 8, approximately 2.625 new pixels are generated for every original input pixel for a total of 10 pixels.

Thus, the Qscale system provides selectable interpolated scalability using simple adder and shifter circuitry while at the same time reducing processing by using all the original pixels as part of the scaled output image. The Qscale system can be used in printers, digital cameras, video processors, or any other image processing system that needs to change the size of an image.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A method for scaling an input image of original pixels into an output image, comprising:

selecting a scale factor from multiple scale factors for scaling the input image, each one of the multiple scale factors associated with one or more additional new pixels for inserting at symmetrical locations between adjacent original pixels in the input image;

determining interpolation coefficients for each one of the new pixels associated with the selected scale factor, each one of the coefficients derived according to the symmetrical spacing between the new pixels and the adjacent original pixels;

generating values for each one of the new pixels by applying the interpolation coefficients for the selected scale factor to the adjacent original pixels in the input image;

mapping the original adjacent pixels from the input image unaltered into the output image; and mapping the generated values for the new pixels into the output image at associated new pixel locations that are symmetrically spaced between the original adjacent pixels.

2. A method according to claim 1 including:

repeatedly inserting new pixels between the original adjacent pixels in a first horizontal or vertical direction of the input image;

identifying a number of additional new symmetrically spaced apart pixels to insert between adjacent pairs of original pixels or adjacent pairs of new pixels in a second direction perpendicular to the first direction according to the scale factor;

determining interpolation coefficients according to the number of additional new symmetrically spaced apart pixels associated with the selected scale factor;

generating values for each one of the additional new symmetrically spaced apart pixels in the second direction by applying the interpolation coefficients to the adjacent pixels;

repeatedly inserting additional new symmetrically spaced apart pixels between the adjacent original pixels or adjacent new pixels in the second direction; and outputting all the additional new pixels in the output image.

3. A method according to claim 1 wherein generating the new pixel values comprises shifting the adjacent original pixel values and adding the shifted original pixel values together.

4. A method according to claim 1 wherein the new pixels are generated according to the following:

$$Pn = \Sigma_n [\alpha_n \cdot P1 + \beta_n \cdot P2]; \ n=1,2,\ldots,N$$

Where, N is the number of identified new pixels; $\alpha_n$ and $\beta_n$ are the interpolation coefficients; $\alpha_n + \beta_n = 1$ for all n; Pn is the $n^{th}$ new pixel; and P1 and P2 are the adjacent original pixels.

5. A method according to claim 1 including:

storing for each scale factor a scaling factor value having an integer portion and a fraction portion;

using the integer portion as the number of new pixels symmetrically spaced between a first pair of adjacent original pixels;

adding a fractional portion of the number of new pixels to the scaling factor value to generate a next number of new pixels; and using an integer portion of the next number of new pixels as the number of new pixels to insert between a next pair of selected original pixels.

6. A method according to claim 1 wherein determining interpolation coefficients comprises the following:

storing every one of the interpolation coefficient values used for each one of the different scale factors;

generating a first array of scaled values by applying in parallel each one of the stored interpolation coefficient values to a first one of the adjacent pixels;

generating a second array of scaled values by applying in parallel each one of the stored interpolation coefficient values to a second adjacent one of the adjacent pixels;

selecting the scaled values from the first and second array associated with the selected scale factor;

combining selected scaled values from the first array with selected scaled values from the second array to form the new pixel values; and outputting the new pixel values into the output image between the first and second adjacent original pixels.

7. A system for scaling an input image having an array of original pixels, comprising:

a coefficient generator that generates a set of coefficients for generating a selectable number of new pixels for inserting between adjacent original pixels, the coefficient generator generating the entire set of interpolation coefficients in parallel at the same time by applying the entire set of coefficients to a first one and to a second one of the original adjacent pixels;

an accumulation circuit selecting different selectable ones of the interpolation coefficients generated from the first one of the adjacent original pixels according to a scale factor and selecting different selectable ones of the interpolation coefficients generated from the second one of the adjacent original pixels according to the scale factor;

an interpolation engine that combines the selected interpolation coefficients generated from the first one of the adjacent original pixels together with the selected interpolation coefficients generated from the second one of the adjacent original pixels in parallel to generate all of the new pixels at the same time; the interpolation engine outputting, both the original adjacent pixels as-is from the input image and the new pixels interpolated from the original pixels as an output image.

8. A system according to claim 7 wherein the accumulation circuit comprises:
- a first register for storing the scale factor;
- an adder having a first input receiving the scale factor from the first register, a second input and an output; and
- a second register having an input receiving the adder output, a first output outputting the number of new pixels inserted between the selected original pixels and a second output outputting a fractional portion of the new pixel number to the second input of the adder.

9. A system according to claim 7 wherein the coefficient generator comprises only bit shifters and adders.

10. A system according to claim 9 wherein the coefficient generator includes multiple sets of predetermined coefficient values each set associated with one of the possible number of new pixels that can be inserted between the selected original pixels, each set comprising pairs of coefficient values each corresponding with each one of the new pixels and the pairs of coefficient values each applied to one of the two selected original pixels.

11. A system according to claim 10 wherein the coefficient generator includes multiple coefficient generation circuits that are selected according to the pair of coefficient values associated with the new pixels.

12. A system according to claim 7 wherein the interpolation engine comprises:
- a first multiplexer selecting one of the interpolation coefficients associated with a first one of the selected original pixels;
- a second multiplexer selecting one of the interpolation coefficients associated with a second one of the selected original pixels; and
- an adder adding together the selected interpolation coefficients.

13. A system according to claim 7 wherein the coefficient generator, accumulation circuit and interpolation engine together generate new pixels according to the following:

$$Pn = \Sigma_n [\alpha_n \cdot P1 + \beta_n \cdot P2]; n = 1, 2, \ldots, N$$

Where N is the number of new pixels inserted between the selected original pixels; $\alpha_n$ and $\beta_n$ are the coefficients; $\alpha_n + \beta_n = 1$ for all $n^{th}$ new pixel; and P1 and P2 are the selected original pixels.

14. A system according to claim 7 wherein:
- the new pixels are derived and inserted between horizontally adjacent pixels for each row of original pixels in the original image and then the new pixels are derived and inserted between pixels in vertically adjacent rows for each column of the combined original pixels and new pixels; or
- the new pixels are derived and inserted between pixels on vertically adjacent rows for each column of the original pixels and then the new pixels derived and inserted between pixels in horizontally adjacent columns for each row of the combined original pixels and new pixels.

15. A method for scaling an input image having input pixels into an output image, comprising:
- mapping all of the input pixels from the input image into the output image;
- determining numbers of new pixels to insert between adjacent pairs of pixels in a first direction of the input image according to a first scaling factor;
- selecting a set of coefficients for deriving values for the new pixels according to the numbers of new pixels to be inserted between the adjacent pairs of input pixels in the first direction and to provide symmetrical spacing between the new pixels and the adjacent pairs of input pixels;
- deriving values for the new pixels according to the pixel values of the adjacent pair of pixels and the selected set of coefficients;
- determining numbers of new pixels to insert between each adjacent pair of input pixels and each pair of adjacent new pixels in a second direction;
- selecting a set of coefficients for deriving the values of the new pixels in the second direction according to the numbers of new pixels between the adjacent pair of pixels;
- generating values for the new pixels in the second direction using the adjacent pair of pixels and the selected set of coefficients; and
- outputting the new pixels as part of the output image between the input pixels in the output image.

16. A method according to claim 15 wherein generating the new pixel values comprises the following:
- applying a first coefficient to a first one of the adjacent pixels;
- applying a second coefficient to a second one of the adjacent pixels; and
- adding the first applied coefficient and second applied coefficient together.

17. A method according to claim 16 wherein applying the first and second coefficient comprises bit shifting the first and second adjacent pixels.

18. A method according to claim 15 wherein the number of new pixels are determined using a Bresenham accumulation.

* * * * *